United States Patent
El-Gammal et al.

(10) Patent No.: US 12,361,771 B2
(45) Date of Patent: Jul. 15, 2025

(54) PREDICTION AND IDENTIFICATION OF POTENTIAL BEARING ANOMALIES WITHIN AN ELECTRIC MOTOR OF AN ELECTRIC VEHICLE

(71) Applicant: Robert Bosch GmbH, Stuttgart (DE)

(72) Inventors: Mohamed Moustafa El-Gammal, Windsor (CA); Juergen Guenther Zybell, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 340 days.

(21) Appl. No.: 17/828,894

(22) Filed: May 31, 2022

(65) Prior Publication Data

US 2023/0386270 A1    Nov. 30, 2023

(51) Int. Cl.
| | |
|---|---|
| *G01M 13/045* | (2019.01) |
| *B60L 3/00* | (2019.01) |
| *G07C 5/08* | (2006.01) |
| *G07C 5/10* | (2006.01) |
| G07C 5/00 | (2006.01) |

(52) U.S. Cl.
CPC .......... *G07C 5/0816* (2013.01); *B60L 3/0061* (2013.01); *G01M 13/045* (2013.01); *G07C 5/10* (2013.01); *B60L 2240/12* (2013.01); *B60L 2240/425* (2013.01); *B60L 2240/429* (2013.01); *G07C 5/008* (2013.01)

(58) Field of Classification Search
CPC ............ B60L 2240/12; B60L 2240/42; B60L 2240/425; B60L 2240/429; B60L 2270/145; B60L 3/0061; B60L 3/12; G01M 13/045; G07C 5/008; G07C 5/0816

See application file for complete search history.

(56) References Cited

U.S. PATENT DOCUMENTS

| | | | |
|---|---|---|---|
| 6,466,876 B1 | 10/2002 | Broehan et al. | |
| 7,415,365 B2 | 8/2008 | Jeppe | |
| 8,036,788 B2 | 10/2011 | Breed | |
| 10,344,637 B2 | 7/2019 | Bong | |
| 10,928,455 B2 | 2/2021 | Bazzi et al. | |
| 11,060,933 B2 | 7/2021 | Bormann et al. | |
| 2007/0185642 A1 | 8/2007 | Grai et al. | |

(Continued)

FOREIGN PATENT DOCUMENTS

CA       3072045 A1 *  2/2019  ............... A01B 3/02

OTHER PUBLICATIONS

Manhertz, et al., STFT spectrogram based hybrid evaluation method for rotating machine transient vibration analysis (2021) (Year: 2021).*

(Continued)

*Primary Examiner* — Charles J Han
(74) *Attorney, Agent, or Firm* — Michael Best & Friedrich LLP

(57) ABSTRACT

Systems and methods for predicting an anomaly within an electric motor of an electric vehicle. One method includes receiving sensor information from a knock sensor, wherein the sensor information represents a detected vibration of the electric motor, deriving, from the sensor information, a signal characteristic, determining, based on the signal characteristic, a potential anomaly within the electric motor, and generating an alert to user based on the potential anomaly.

18 Claims, 5 Drawing Sheets

(56) References Cited

U.S. PATENT DOCUMENTS

2019/0383705 A1   12/2019   Smart et al.
2021/0287459 A1   9/2021    Cella et al.

OTHER PUBLICATIONS

He et al., "Electrical bearing failures in electric vehicles", Friction, 2020, vol. 8, No. 1, pp. 4-28.
International Search Report for Application No. PCT/EP2023/064060 dated Aug. 24, 2023 (5 pages).
Manhertz et al., "STFT Spectrogram Based Hybrid Evaluation Method for Rotating Machine Transient Vibration Analysis," Mechanical Systems and Signal Processing, 2021, vol. 154, 16 pages.
Noyjeen et al., "Monitoring Parameters of Three-Phase Induction Motor Using IoT," 9th International Electrical Engineering Congress (IEECON), 2021, pp. 483-486.

\* cited by examiner

PREDICTION AND IDENTIFICATION OF POTENTIAL BEARING ANOMALIES WITHIN AN ELECTRIC MOTOR OF AN ELECTRIC VEHICLE

BACKGROUND

Engine knock occurs when there is incomplete or non-uniform ignition of fuel within a combustion chamber of an engine. The engine may be included in, for example, a passenger vehicle. When engine knock occurs, it may cause damage to the engine. Sensors are traditionally utilized for detecting engine knock within combustion engines.

SUMMARY

In electric vehicles, bearing degradation in an electric motor (for example, the main motor that provides power to drive the vehicle) may lead to increased friction levels within the motor. This may result in degradation of the performance of the vehicle. For example, bearing degradation may cause an increase in motor power consumption, which may reduce the driving range of the vehicle, generate noise and vibrations within the vehicle, increase heat within the vehicle, and result in damage to one or more components of the electric motor.

As mentioned above, knock sensors are traditionally used to detect irregular ignition of fuel within a combustion chamber of an engine. In the case of electric vehicles, it has been discovered that knock sensors (which may be less expensive than other types of vibration sensors) may be utilized for detecting abnormalities within the electric motor (for example, the bearings) that may potentially lead to abnormalities within the electric motor.

It would be beneficial if anomalies within the electric motor bearings (or other components of the motor) could be detected early to help avoid damage to the system. Embodiments and aspects described herein provide, among other things, a system and a method for utilizing a deep learning system to predict anomalies within an electric motor of an electric vehicle via a knock sensor and, in some instances, using collected data from a network of electric vehicles.

One example provides a system for predicting an anomaly in an electric vehicle. The system includes an electric motor, a knock sensor, and an electronic processor. The electronic processor is configured to receive sensor information from the knock sensor, wherein the sensor information represents a detected vibration of a bearing of the electric motor, derive, from the sensor information, a signal characteristic, determine, based on the signal characteristic, a potential anomaly within the electric motor, and generate an alert to user based on the potential anomaly.

Another example provides a method for predicting an anomaly within an electric motor of an electric vehicle. The method includes receiving sensor information from a knock sensor, wherein the sensor information represents a detected vibration of the electric motor, deriving, from the sensor information, a signal characteristic, determining, based on the signal characteristic, a potential anomaly within the electric motor, and generating an alert to user based on the potential anomaly.

Other aspects, features, and embodiments will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments and aspects of concepts that include the claimed subject matter, and explain various principles and advantages of various aspects and embodiments.

Figure 1:
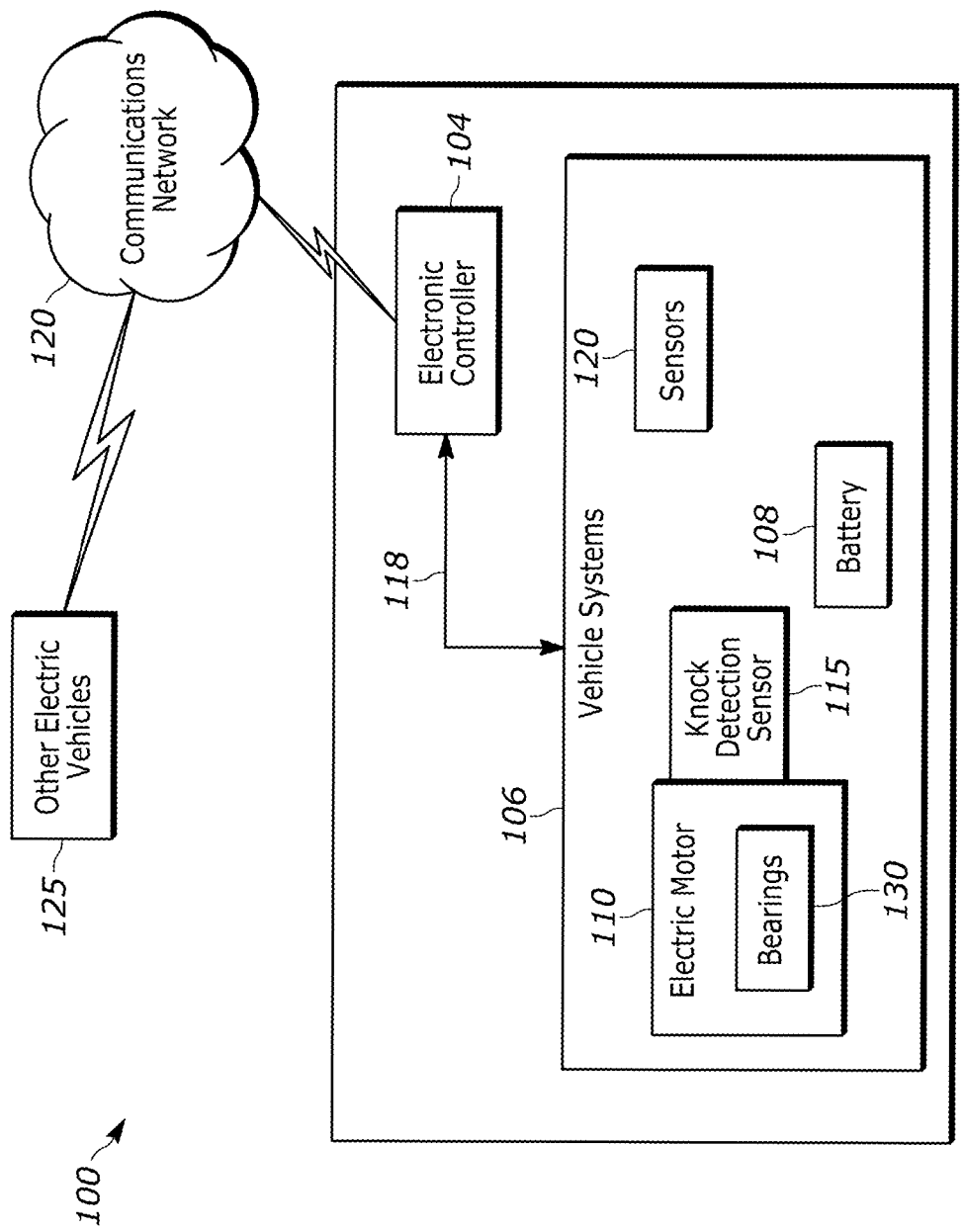
FIG. 1 is a block diagram of a vehicle system, in accordance with some aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments and aspects.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments, aspects, examples, and features are explained in detail, it is to be understood that the embodiments, aspects, examples, and features are not limited in their application to the details of construction and the arrangement of components set forth in the following description or illustrated in the following drawings. Other embodiments, aspects, examples, and features are possible and may be practiced or carried out in various ways.

It should also be noted that a plurality of hardware and software-based devices, as well as a plurality of different structural components may be used to implement embodiments, aspects, examples, and features. In addition, it should be understood that embodiments, aspects, examples, and features may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one example, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized in various instances. For example, "control units" and "controllers" described in the specification can include one or more electronic processors, one or more physical memory modules including non-transitory computer-readable medium, one or more input/output interfaces, and various connections (for example, a system bus) connecting the components.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

The systems and methods described herein may be used with any electric vehicle capable of operating partially or fully autonomously, being controlled manually by a driver, or some combination of both. The term "driver," as used herein, generally refers to an occupant of an electric vehicle who is seated in the driver's position, operates the controls of the vehicle while in a manual mode, or provides control input to the vehicle to influence the operation of the vehicle.

In should be understood that while the examples discussed herein are in regard to utilizing a knock sensor to detect/predict a potential within an electric motor of an electric vehicle, the systems and methods described herein may also be applied to other components of an electric vehicle. Such components may be, for example, an inverter, a stator winding, a permanent magnet, and the like. Additionally, while the examples explained herein are in regard to an electric vehicle, it should be understood that the systems and methods described herein may be applied to other automotive and non-automotive motor systems, electric or non-electric (for example, fan motor systems such as heating and air-conditioning systems and the like). Additional example systems include axle and braking systems, such as those of mining and construction equipment, FIG. 1 illustrates a system 100 for detecting/predicting an anomaly in an electric motor 110 of an electric vehicle 102 according to some embodiments. The electric vehicle 102 may be any type of electrically driven motor vehicle including hybrid vehicles and fuel cell electric vehicles. In the example illustrated, the system 100 includes an electronic controller 104, vehicle systems 106, a battery 108, the electric motor 110, a knock (vibration) sensor 115, and other sensors 120. In some instances the system 100 also includes a communications network 120 and other electric vehicles 125. The other vehicles 125 include one or more electric vehicles configured similar to that of the vehicle 102. The components of the system 100, along with other various modules and components are electrically coupled to each other by or through one or more control or data buses (for example, the bus 118), which enable communication therebetween.

The use of control and data buses for the interconnection between, and communication among, the various modules and components would be known to a person skilled in the art in view of the invention described herein. In some instances, the bus 118 is a Controller Area Network (CAN™) bus. In some instances, the bus 118 is an automotive Ethernet™, a FlexRay™ communications bus, or another suitable wired bus. In alternative instances, some or all of the components of the system 100 may be communicatively coupled using suitable wireless modalities (for example, Bluetooth™ or near field communication). For ease of description, the system 100 illustrated in FIG. 1 includes one of each of the foregoing components. Alternative instances may include one or more of each component or may exclude or combine some components.

The electronic controller 104 (described more particularly below with respect to FIG. 2) operates the vehicle systems 106 and the sensors 120 to control, maintain, and/or drive the vehicle 102. The electronic controller 104, for example, receives sensor telemetry from the sensors 120 and determines control/maintenance data and commands for the vehicle. The electronic controller 104 transmits the vehicle control data to, among other things, the vehicle systems 106 to drive the vehicle (for example, by generating braking signals, acceleration signals, steering signals).

The vehicle systems 106 include controllers (for example, controller 104), motors (for example, electric motor 110), batteries (for example, battery 108), sensors (for example, sensors 115 and 120), actuators, and the like for controlling aspects of the operation of the vehicle 102 (for example, steering, acceleration, braking, shifting gears, fluid coolant systems, and the like) based on user input or, in some instances, autonomously based on the sensor telemetry. The vehicle systems 106 are configured to send and receive data relating to the operation and maintenance of the vehicle 102 to and from the electronic controller 104.

The battery 108 may be part of a high voltage or low voltage system (both not shown) of the vehicle 102. The high voltage system is the main power system that provides, among other things, power to drive the vehicle 102 (for example, to the motor 110). The low voltage system is the accessory power system, which receives and converts power from the high voltage system, which provides power to accessories of the vehicle 102 (for example, headlights, windshield wipers, taillights, and the like).

The electric motor 110 may be part of a driving system (part of the vehicle systems 106) of the vehicle 102 and configured to provide motive power to move the vehicle 102. The motor 110 is configured to receive power from the battery 108. In some instances, the electric motor 110 may be part of another system 106 of the vehicle 102. For example, the motor 110 may be part of an air conditioning system of the vehicle 102. In some instances, the battery 108 and/or the motor 110 are integrated into an electric axle of the vehicle 102 (for example, a front or rear tire axle of the vehicle 102, which is not shown).

The knock sensor 115 (and, in some instances, the other sensors 120) determine one or more attributes of the vehicle 102 and communicate information regarding those attributes to the other components of the system 100 using, for example, electrical signals. The knock sensor 115, in particular, is a vibration sensor traditionally used to detect engine knock within a combustion engine. In the illustrated example, the knock sensor is a transducer capable of sensing vibrations in a vehicle component, converting the vibrations to electrical signals, and transmitting the electrical signals to the electronic controller 104 as sensor information. The sensor 115 is positioned such that it detects vibrations (for example, in a horizontal direction normal to the bearing/shaft direction) of the electric motor 110. In some instances, the knock sensor 115 may be integrated into the electric motor 110. More than one knock sensor 115 may be utilized in the systems and methods described herein.

In some instances, the sensor 115 is integrated into another vehicle sensor (for example, one or more of the other sensors 120). For example, the sensor 115 may be integrated into an accelerometer. In some instances, the sensor 115 is part of a strain gauge, an eddy-current sensor, a gyroscope, a microphone, or another suitable vibration sensor. In some instances, multiple sensors are used, for example, mounted at different points on the vehicle 102 proximate to the motor 110.

As described herein, the electronic controller 104 processes the electrical signals received from the sensor 115 to produce vibration signal information related to the electric motor 110, which may be analyzed to determine/identify a potential anomaly (for example, a bearing fault), which is causing the vibration. In some instances, the sensor 115 includes on board signal processing circuitry, which produces and transmits sensor information including vibration patterns to the electronic controller 104 for processing. The electronic controller 104 receives and interpret the signals received from the knock sensor 115 (and, in some instances, one or more of the other sensors 120) to automatically detect/predict wear and failure of the electric motor 110 of the vehicle 102 (for example, in the bearings 130 of the motor 110).

In addition to the knock sensor 115, the system 100 includes one or more other sensors 120. The sensors 120 determine one or more attributes of the vehicle 102 and its surrounding environment and communicate information regarding those attributes to the other components of the system 100 using, for example, electrical signals. The vehicle attributes include, for example, the position of the vehicle or portions or components of the vehicle 102, the movement of the vehicle 102 or portions or components of the vehicle 102, the forces acting on the vehicle 102 or portions or components of the vehicle 102, the proximity of the vehicle 102 to other vehicles (for example, the other vehicles 125) or objects (stationary or moving), coolant inlet/outlet temperature (for example, coolant to reduce one or more electrical components of the vehicle 102, such as the electrical motor 110 and/or battery 108), temperature of one or more components, motor current draw, yaw rate, sideslip angle, steering wheel angle, superposition angle, vehicle speed, longitudinal acceleration, and lateral acceleration, and the like. The sensors 120 may include, for example, vehicle control sensors (for example, sensors that detect accelerator pedal position, brake pedal position, and steering wheel position/angle), wheel speed sensors, vehicle speed sensors, yaw sensors, force sensors, odometry sensors, and vehicle proximity sensors (for example, camera, radar, LIDAR, and ultrasonic).

The communications network 120 is a communications network including wireless connections, wired connections, or combinations of both. The communications network 120 may be implemented using a wide area network, for example, the Internet (including public and private IP networks), a Long Term Evolution (LTE) network, a 4G network, 5G network and one or more local area networks, for example, a Bluetooth™ network or Wi-Fi network, and combinations or derivatives thereof.

The example illustrated in FIG. 1 provides but one example of the components and connections of the system 100. However, these components and connections may be constructed in other ways than those illustrated and described herein. It should be noted that while the system 100 is illustrated as being included in a four wheeled vehicle 102 the system 100 may be included in various types and designs of electric vehicles. For example, the system 100 may be included in an automobile, a motorcycle, a truck, a bus, a semi-tractor, aviation system, drone, and others.

Figure 2:
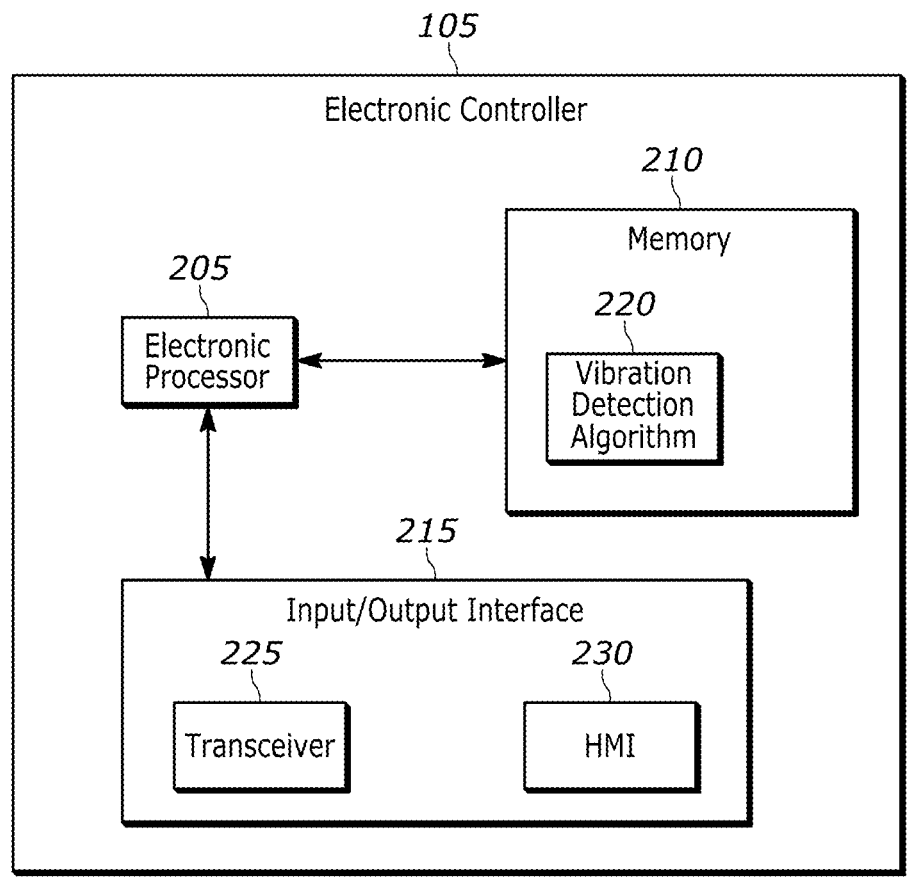
FIG. 2 schematically illustrates an electronic controller of the system of FIG. 1, in accordance with some aspects.

FIG. 2 is a block diagram of the electronic controller 104 of the system 100. The electronic controller 104 includes a plurality of electrical and electronic components that provide power, operation control, and protection to the components and modules within the electronic controller 104. The electronic controller 104 includes, among other things, an electronic processor 205 (such as a programmable electronic microprocessor, microcontroller, or similar device), a memory 210 (for example, non-transitory, computer readable memory), and an input/output interface 215. The electronic processor 205 is communicatively connected to the memory 205 and the input/output interface 210. The electronic processor 205, in coordination with the memory 205 and the input/output interface 210, is configured to implement, among other things, the methods described herein. It should be understood that some or all of the components, including additional components, of the controller 104 may be remote/dispersed from each other within the vehicle 102 and/or remote from the vehicle 102 (for example, part of the knock sensor 115, the communications network 120 and/or other vehicles 125).

The memory 210 may be made up of one or more non-transitory computer-readable media and includes at least a program storage area and a data storage area. The program storage area and the data storage area can include combinations of different types of memory, such as read-only memory ("ROM"), random access memory ("RAM"), flash memory, or other suitable memory devices. The electronic processor 205 is coupled to the memory 210 and the input/output interface 215.

The electronic processor 205 sends and receives information (for example, from the memory 210 and/or the input/output interface 215) and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, software for automatic detection/prediction of an anomaly within the electric motor 110 and for performing methods as described herein. In the example illustrated, the memory 210 stores, among other things, a vibration detection algorithm 220, which operates as described herein (for example, the method 300 described in regard to FIG. 3 below) to detect and classify vibration patterns to identify and/or predict anomalies within the electric motor 110 (for example, regarding the bearings 120 and/or the runways thereof, of the motor 110).

In some instances, the electronic controller 205 may be implemented in several independent controllers (for example, programmable electronic controllers) each configured to perform specific functions or sub-functions. For example, one or more components of the controller 205 may be remote from the vehicle 105 (for example, part of a remote server, which is not shown, of the communications network 120). Additionally, the electronic controller 205 may contain sub-modules that include additional electronic processors, memory, or circuits for handling input/output functions, processing of signals, and application of the methods listed below. In other instances, the electronic controller 205 includes additional, fewer, or different components. Thus, the programs may also be distributed among one or more processors.

The input/output interface 215 transmits and receives information from devices external to the electronic controller 104 (for example, over one or more wired and/or wireless connections), for example, components of the system 100 via the bus 118. The input/output interface 215 receives input (for example, from the knock sensor 115 and sensors 120 etc.), provides system output (for example, to the transceiver 225 and/or the HMI 230, etc., or a combination of both). The input/output interface 215 may also include other input and output mechanisms, which for brevity are not described herein and which may be implemented in hardware, software, or a combination of both.

In some instances, the controller 104 further includes the transceiver 225 and the human machine interface (HMI) 230. The transceiver 225 includes a radio transceiver communicating data over one or more wireless communications networks (for example, cellular networks, satellite networks, land mobile radio networks, etc.) including the communications network 120. The transceiver 225 also provides wireless communications within the vehicle using suitable network modalities (for example, Bluetooth™, near field communication (NFC), Wi-Fi™, and the like). Accordingly, the transceiver 225 communicatively couples the electronic controller 104 and other components of the system 100 with networks or electronic devices both inside and outside the vehicle 102. For example, the electronic controller 104, using the transceiver 225, can communicate with a one or more devices (for example, other vehicles 125) over the communications system 120 to send and receive data, commands, and other information (for example, component anomaly notifications). The transceiver 225 includes other components that enable wireless communication (for example, amplifiers, antennas, baseband processors, and the like), which for brevity are not described herein and which may be implemented in hardware, software, or a combination of both. Some instances include multiple transceivers or separate transmitting and receiving components (for example, a transmitter and a receiver) instead of a combined transceiver.

The HMI 230 provides visual output, such as, for example, graphical indicators (i.e., fixed or animated icons), lights, colors, text, images, combinations of the foregoing, and the like. The HMI 230 includes a suitable display mechanism for displaying the visual output, such as, for example, an instrument cluster, a heads-up display, a center console display screen (for example, a touch screen, or other suitable mechanisms. In some instances, the HMI 230 displays a graphical user interface (GUI) (for example, generated by the electronic controller and presented on a display screen) that enables a driver or passenger to interact with the vehicle 102. The HMI 230 may also provide audio output to the driver such as a chime, buzzer, voice output, or other suitable sound through a speaker included in the HMI 230 or separate from the HMI 230. In some instances, HMI 230 provides haptic outputs to the driver by vibrating one or more vehicle components (for example, the vehicle's steering wheel and the seats), for example, using a vibration motor. In some instances, HMI 230 provides a combination of visual, audio, and haptic outputs.

As will be described in further detail below, in some instances the memory 205 includes, among other things, computer executable instructions for detecting, predicting, and/or identifying one or more anomalies within the motor 110. In some instances, the computer executable instructions include instructions for training a deep learning system to detect/predict one or more anomalies related to the bearings 130 within the electric motor 110 of the vehicle 102.

In some instances, the electronic controller 104 uses one or more machine learning methods (for example, artificial intelligence algorithms) to analyze sensor information from the knock sensor 115 to identify/predict anomalies within the electric motor 110 (as described herein). Machine learning generally refers to the ability of a computer program to learn without being explicitly programmed. In some instances, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, edge computing, inductive logic programming, support vector machines, clustering, Bayesian networks, reinforcement learning, representation learning, similarity and metric learning, sparse dictionary learning, and genetic algorithms. Using these approaches, a computer program can ingest, parse, and understand data and progressively refine algorithms for data analytics.

As mentioned above, in some instances, one or more components, including additional components (for example, additional components similar to those described above in regard to FIG. 2), of the electronic controller 104 may be positioned or distributed throughout the vehicle 102 or remote from the vehicle 102. In some embodiments the knock sensor 115 is directly coupled to an electronic controller (for example, the electronic controller 104 or a separate electronic controller, which is not shown, which includes components similar to those of controller 104). The controller may include an electronic processor, memory, input/output interface, transceiver, and/or the like. The controller 104 (and/or the second controller) may include additional components such as a battery. In some embodiments, the knock sensor 115 and the electronic controller are positioned on/within a card or circuit board (not shown). In addition, in some instances, the controller wirelessly communicates with one or more other device. For example, the electronic controller 104 communicates with one or more other electronic communication devices of the communications network 120).

Figure 3:
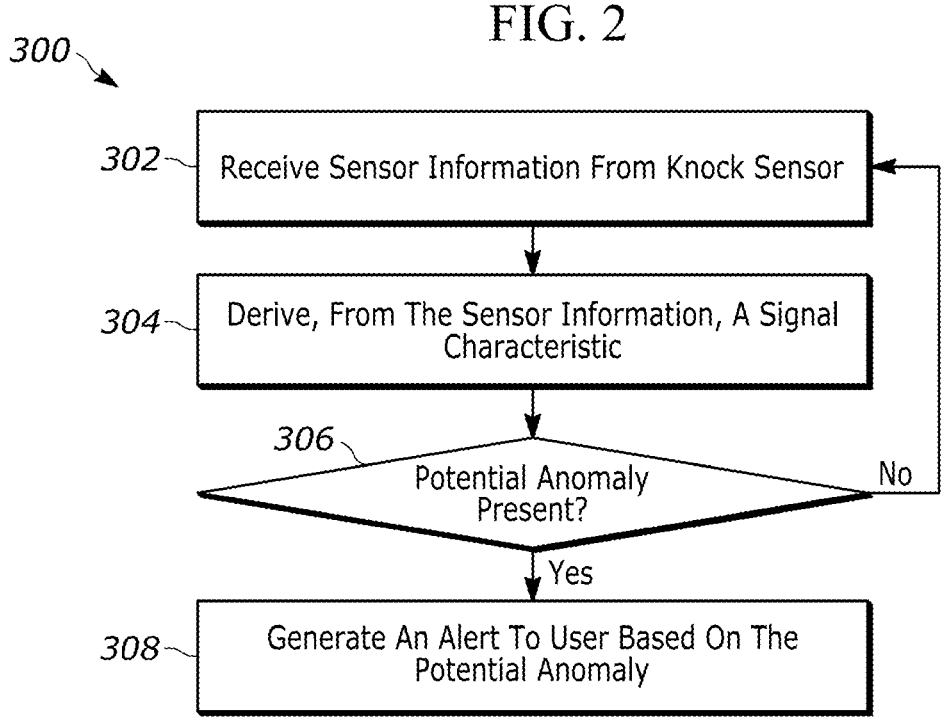
FIG. 3 is a flowchart of an example method for predicting an anomaly within an electric motor of the vehicle of FIG. 1, in accordance with some aspects.

FIG. 3 illustrates an example of a method 300 for predicting an anomaly within an electric motor of an electric vehicle (for example, vehicle 102 of FIG. 1). Although the method 300 is described in conjunction with the system 100 as described herein, the method 300 could be used with other systems and vehicles. In addition, the method 300 may be modified or performed differently than the specific example provided. As an example, the method 300 is described as being performed by the electronic controller 104 and, in particular, the electronic processor 205. However, it should be understood that in some instances, portions of the method 300 may be performed by other devices or subsystems of the system 100.

At block 302, the electronic processor 205 receives sensor information from a first sensor (for example, the knock sensor 115) positioned within the vehicle 102 and configured to sense vibrations of the electric motor 110 of the vehicle 102. The sensor information represents a detected vibration of a bearing (for example, one or more of the bearings 130) of the electric motor 110. In some instances, the electronic processor 205 receives the sensor information continuously. In some instances, the electronic processor 205 receives periodic bursts of sensor information from the knock sensor 115. In some instances, the sensor information is stored in a buffer or other memory of the electronic controller 104 until it can be processed. In some embodiments, the knock sensor 115 is configured to automatically periodically collect and transmit information to the processor 205 (for example, once every 24 hours).

At block 304, the electronic processor 205 derives, from the sensor information, one or more signal characteristics. The signal characteristic, for example, may be a frequency component of the vibration signal detected by the sensor 115. The one or more signal characteristics may be derived, for example, via a principal component analysis (PCA). In some instances, deriving the signal characteristic includes applying one or more filters to the raw sensor information to remove one or more background vibration noises (for example, vibrations caused by the road in which the vehicle 102 is driving on). In some instances, the electronic processor 205 compares the sensor information to a vibration noise floor to extract one or more signal characteristics that exceed the noise floor. In some instances, the noise floor is a pre-determined value set by the vehicle manufacture. In some instances, the vibration noise floor may be established by the electronic processor 205 as the vehicle 102 operates over time.

At block 306, the electronic processor 205 determines, based on the signal characteristic, a potential anomaly within the electric motor 110. The potential anomaly may be any kind of reduction in functionality of the electric motor 110. In some instances, the processor 205 identifies a type of bearing fault of the electric motor 110. The bearing fault may be, for example, damage of the outer ring or inner ring holding the bearings of the engine 115. The bearing fault may be damage to one or more ball bearings or to a rivet of the motor 115. The fault may be a dirt level (for example, dust or grease in the bearings of the motor 110), damage caused by an electric current within the vehicle 102 ("grey frosting") and/or corrosion, and/or pre-pitting damage. In some instances, the electronic processor 205 is configured to identify a single bearing of the bearings 130 and/or runway of the motor 110 that is causing/will cause the potential anomaly. The electronic processor 205 may use a pattern matching algorithm to determine whether the vibration event matches a known vibration pattern associated with a particular component anomaly of the electric motor 110.

In some instances, the electronic processor 205 may determine whether a potential anomaly exists/will occur based on one or more vehicle attributes (for example, received from one or more of the vehicle systems 106 and/or the sensors 120) in addition to the signal characteristic. For example, the processor 205 may be configured to determine the potential anomaly based on a current provided to the electric motor 110. Some types of damage (for example, corrosion) may cause additional draw of electrical power to the motor 110 and thus indicate a potential anomaly related to one or more bearings 130 of the electrical motor 110. Such initial damage within the motor 110 may also affect the temperature of motor 110 (for example, an increase). Thus, in some instances, the processor 205 may additionally determine whether a potential anomaly within the motor 110 exists based on a temperature of the motor 110 and/or a coolant inlet and/or outlet temperature provided to affect the temperature of the motor 110.

Some types of vibrations, for example, may be more indicative of a particular type of component failure when they occur during a steering or braking maneuver. For example, the electronic processor 205 may determine one or more vehicle attributes for a time period beginning just before the vibration pattern starts and ending just after the vibration pattern ends (for example, three seconds before and after the vibration pattern occurred).

In some instances, the electronic processor 205 is further configured to determine the potential anomaly based on historic knock sensor data. Such data may be from the sensor 115 of the vehicle 102 and/or from other vehicles 125. Such data may be stored at a remote device (for example, an electronic communications device and/or other vehicle 125 of the communications network 120).

In some instances, the electronic processor 205 determines that a potential anomaly exists/will occur by classifying the signal characteristic using a machine learning algorithm (for example, a neural network or a classifier), executable by the electronic processor 205. In some instances, the machine learning algorithm is trained using historic data (for example, from the sensor 115 of the vehicle 102 or knock sensors of other vehicles 125). The machine learning algorithm may be fed training data that includes example inputs (for example, information from a knock sensor, such as the sensor 115, representative of a particular component anomalies/potential anomaly of the electric motor 110) and corresponding desired outputs (for example, indications of the anomaly). The training data may also include metadata for the vibration patterns. Metadata may include, for example, the vehicle speed at the time of the vibration pattern, the model of vehicle 102 in which the vibration pattern was sensed, the state of the vehicle 102 at the time of the vibration pattern (for example, braking, accelerating, turning, etc.), thermal and/or electrical characteristics of one or more of the vehicle systems 106, and environmental conditions at the time of the vibration pattern (for example, ambient temperature, ambient humidity, weather conditions, road conditions, etc.). By processing the training data, the machine learning algorithm progressively develops a prediction model that maps inputs to the outputs included in the training data.

At block 308, the electronic processor 205 generates an alert to a user (for example, a driver of the vehicle 102) in response to determining that a potential anomaly within the electric motor 110 exists. The alert may be an audio and/or visual warning (for example, provided via the HMI 116). In some instances, the processor 205 may generate an alert to a user outside of the vehicle 102 (for example, to a maintenance facility) via the communications network 120. In some instances, the processor 205 is configured to identify the cause of the potential anomaly of the electric motor 110.

Figure 4A:
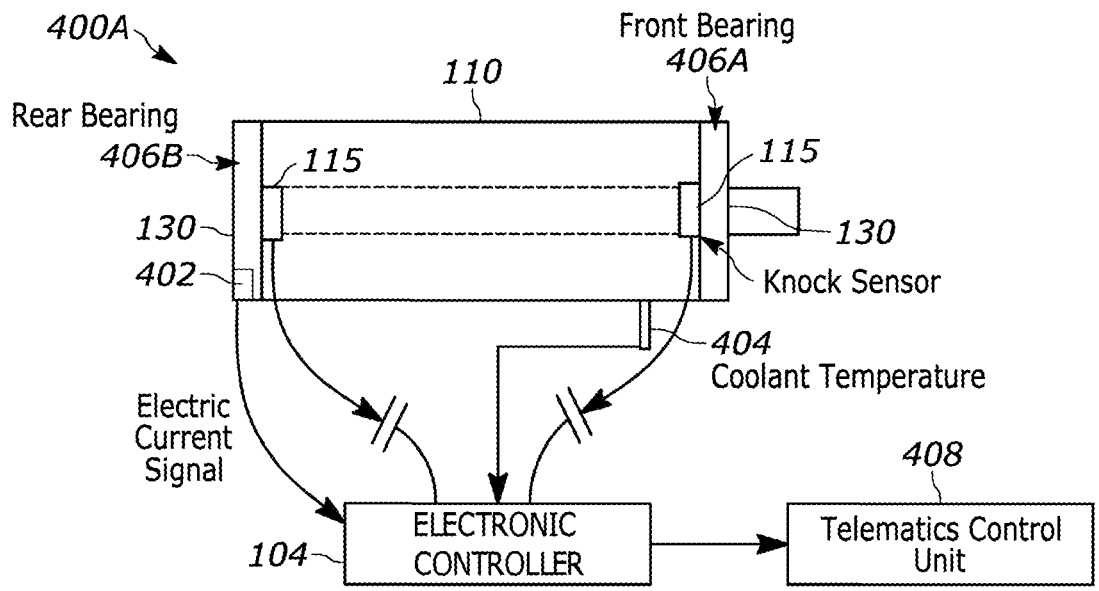
FIG. 4A is a schematic block diagram illustrating the electric motor of the vehicle of FIG. 1, in accordance with some aspects.
Figure 4B:
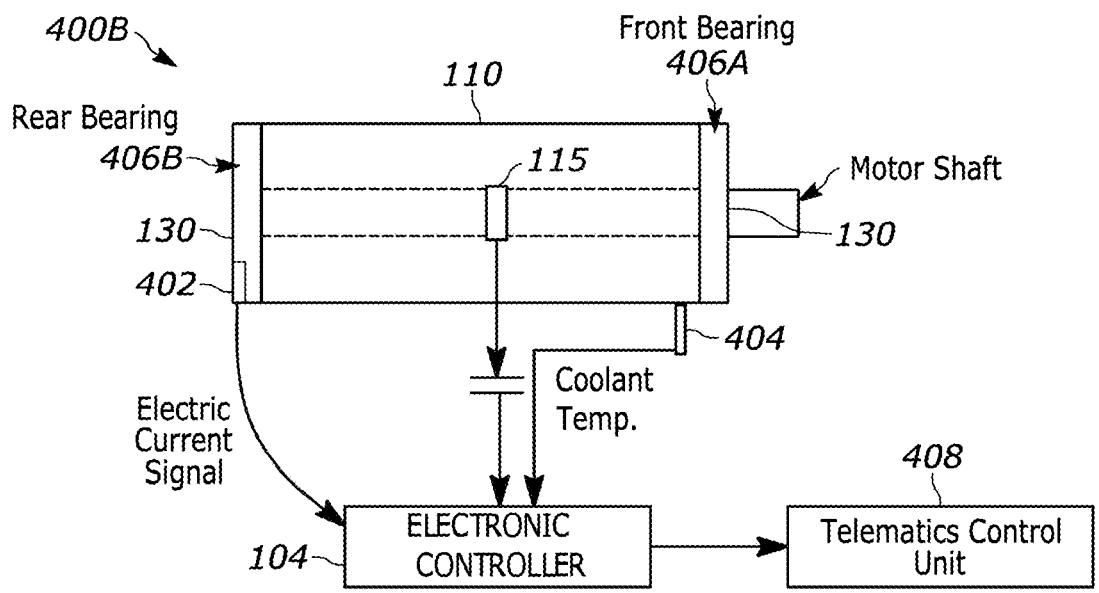
FIG. 4B is a schematic block diagram illustrating the electric motor of the vehicle of FIG. 1, in accordance with some aspects.

FIGS. 4A and 4B are schematic diagrams (400A and 400B respectively) illustrating the electronic controller 104, an electric motor 110, the knock sensor(s) 115, bearings 130, an electric current sensor 402, and a coolant temperature sensor 404. In the embodiment illustrated in FIG. 4A, two knock sensors 115 are positioned such that they detect vibrations at a front bearing 406A and a rear bearing 406B of the motor 110. In the example illustrated in FIG. 4B, a single knock sensor 115 is positioned within the motor 110 between the front bearing 406A and the rear bearing 406B. In both illustrated instances, the controller 104 transmits the sensor information and/or signal characteristics derived therefrom to a telematics control unit 408 part of or remote from the vehicle 102 (for example, part of the communications network 120). The telematics control unit 408, which includes components similar to those of the controller 104 described above in regard to FIG. 2, may be or communicate with one or more servers.

Figure 5:
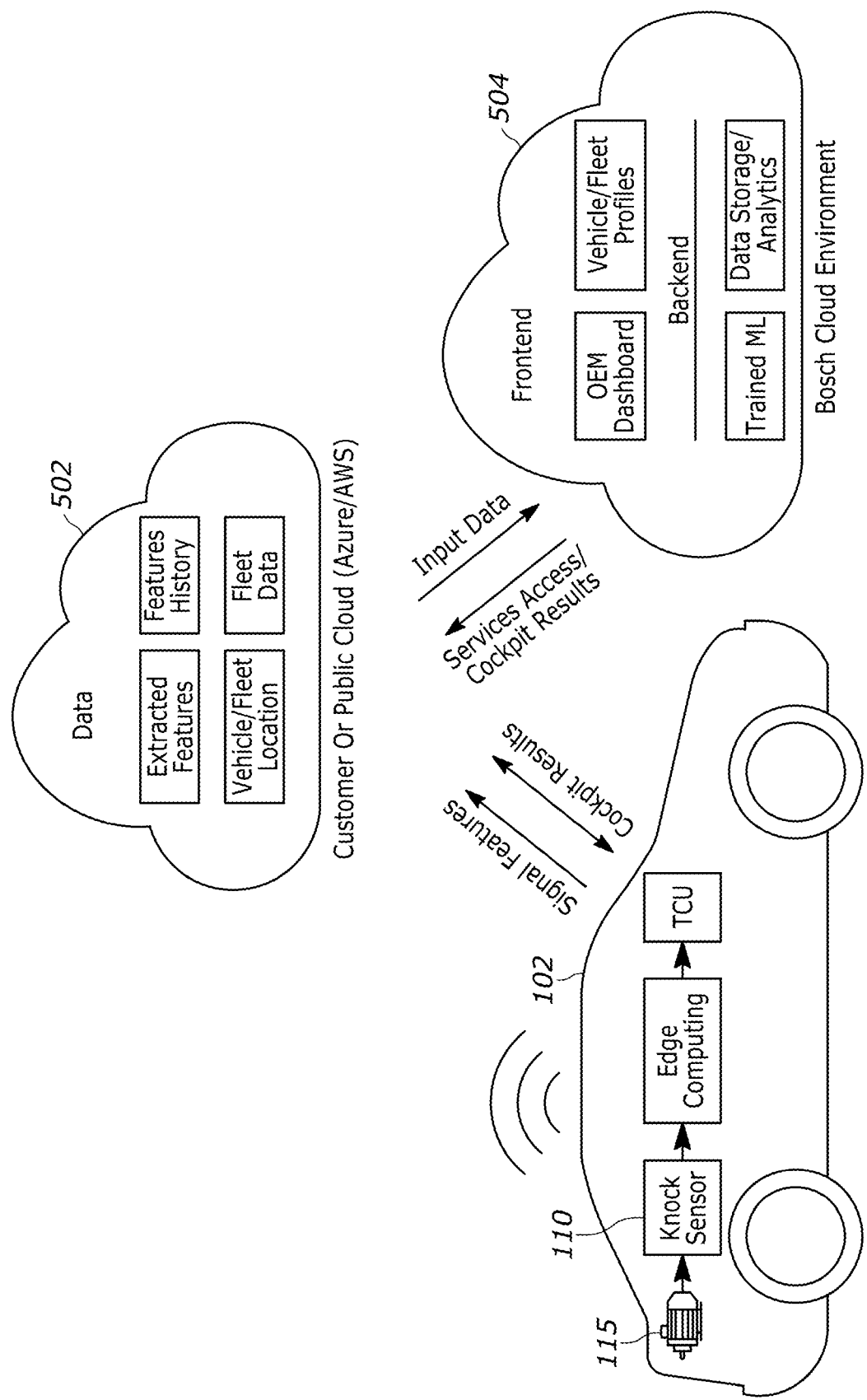
FIG. 5 is a schematic block diagram illustrating another vehicle system, in accordance with some aspects.

For example, as illustrated in the system 500 of FIG. 5, the sensor information/characteristics may be transmitted from the controller 104 of the vehicle 102 to a public/customer cloud data server 502 (for example, control unit 408). In some instances, the illustrated system 500 is a digital twin system. The server 502 may additionally collect information/characteristics from one or more additional vehicles (for example, one or more of the other electric vehicles 125) and provide the knock sensor signal information and/or characteristics to a main server 504. Additional information from the additional vehicles may also be provided to the main server 504. Such information may include, but is not limited to, location information, historic sensor information, and any information regarding a particular vehicle. The main server 504, may collect the information from the server 502 (and additional servers) regarding other electrical vehicles and utilize the information in the determination of the potential anomaly within the engine 115.

As mentioned above, while the examples described above are generally directed to predication/detection of a bearing anomaly in an electric motor vehicle, it should be understood that the described systems and methods may be applied to other components of an electric motor system. For example, torque ripple within electric motors may be caused by one or more harmonics within the magnetic field of the motor generated during operation. The harmonics may be caused by one or more sources (for example, an output of an inverter, an imbalanced rotor, a non-uniform airgap caused by a deformation of either or both of the stator and the rotor, a demagnetization of a permanent magnet of the motor, and the like). Torque ripple may cause vibrations of the motor, which may negatively impact the performance and/or lifetime of one or more components of the motor system.

Figure 4C:
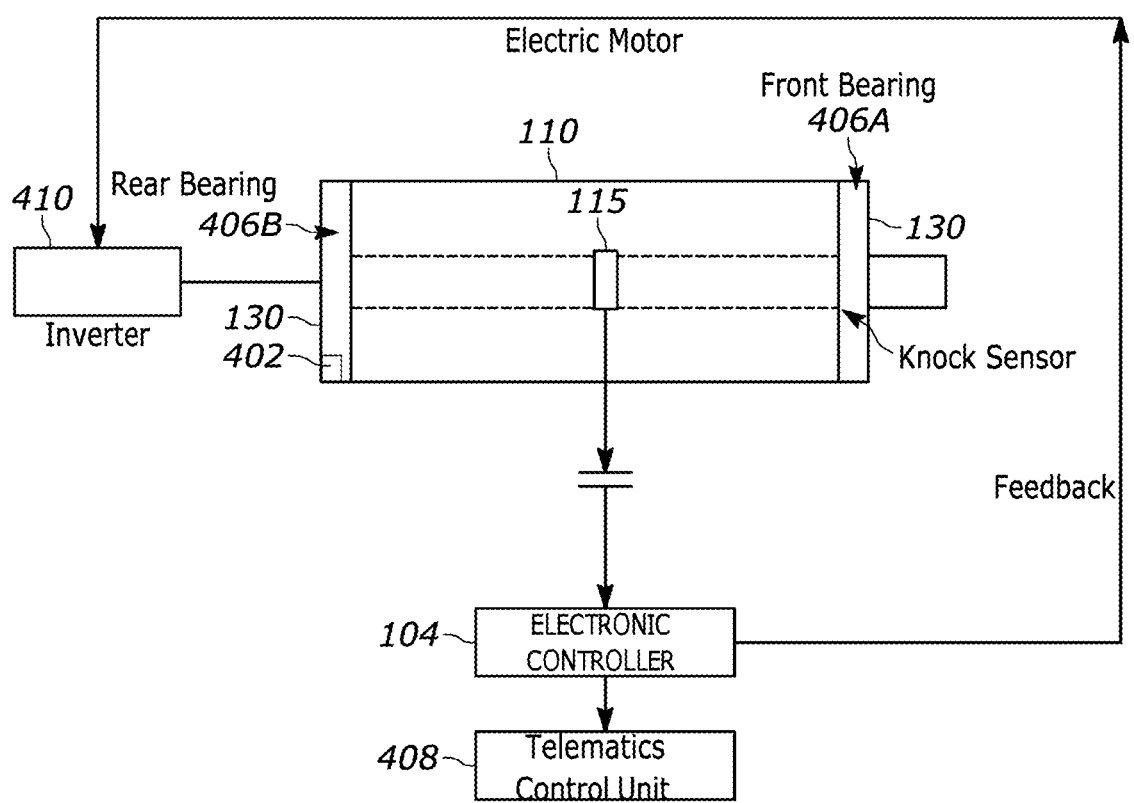
FIG. 4C is a schematic block diagram illustrating the electric motor of the vehicle of FIG. 1, in accordance with some aspects.

FIG. 4C is a schematic block diagram 400C of the vehicle 100, in accordance with some aspects. The electronic processor 205 receives and analyzes sensor information from the knock sensor 115 to derive a signal characteristic as described above in regard to blocks 302, 304, and 306 of FIG. 3. The electronic processor 205 may be further configured to identify, based on the signal characteristic, whether the characteristic is indicative of a bearing anomaly or indicative of a torque ripple. When the processor 205 determines that the characteristic is indicative of torque ripple, the electronic processor 205 may adjust a current provided to an inverter 410 of the vehicle to accordingly adjust the current provided to the motor to reduce the torque ripple.

Thus, the examples described herein provide, among other things, a control system for an electric vehicle configured to detect/predict anomalies within an electric motor of the vehicle.

In the foregoing specification, specific examples, aspects, and features have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, aspects, advantages, and embodiments are set forth in the following claims.

The invention claimed is:

1. A system for predicting an anomaly in an electric vehicle, the system comprising:
an electric motor;
a knock sensor; and
an electronic processor, the electronic processor configured to:
receive sensor information from the knock sensor, wherein the sensor information represents a detected vibration of a bearing of the electric motor;
derive, from the sensor information, a signal characteristic;
determine, based on the signal characteristic, a potential anomaly within the electric motor;
identify, based on the signal characteristic, that the potential anomaly is a torque ripple within the electric motor caused by a source within the electric vehicle other than the bearing of the electric motor, and
generate an alert to a user based on the potential anomaly.

2. The system of claim 1, wherein determining the potential anomaly within the electric motor is further based on historic data of a plurality of other electric vehicles.

3. The system of claim 2, wherein determining the potential anomaly within the electric motor includes utilizing an artificial intelligence algorithm.

4. The system of claim 1, wherein determining the potential anomaly includes identifying a type of bearing fault of the electric motor.

5. The system of claim 4, wherein the type of bearing fault includes at least one selected from the group consisting of an outer ring damage, an inner ring damage, a ball damage, a rivet damage, a corrosion damage, an electric current damage, a pre-pitting damage, and a dirt level.

6. The system of claim 1, wherein the electric motor is an electric axle.

7. The system of claim 1, wherein determining the potential anomaly is further based on at least one selected from the group consisting of a coolant inlet temperature, a coolant outlet temperature, a vehicle speed, and an electric motor current.

8. The system of claim 1, wherein deriving the signal characteristic includes filtering out a background vibrational component from the sensor information.

9. The system of claim 1, wherein the electric vehicle is a hybrid vehicle or a fuel cell electric vehicle.

10. A method for predicting an anomaly within an electric motor of an electric vehicle, the method comprising:
receiving sensor information from a knock sensor, wherein the sensor information represents a detected vibration of the electric motor;
deriving, from the sensor information, a signal characteristic;

determining, based on the signal characteristic, a potential anomaly within the electric motor;

identifying, based on the signal characteristic, that the potential anomaly is a torque ripple within the electric motor caused by a source within the electric vehicle other than the bearing of the electric motor, and generating an alert to a user based on the potential anomaly.

11. The method of claim 10, wherein determining the potential anomaly within the electric motor is further based on historic data of a plurality of other electric vehicles.

12. The method of claim 11, wherein determining the potential anomaly within the electric motor includes utilizing an artificial intelligence algorithm.

13. The method of claim 10, wherein determining the potential anomaly includes identifying a type of bearing fault of the electric motor.

14. The method of claim 13, wherein the type of bearing fault includes at least one selected from the group consisting of an outer ring damage, an inner ring damage, a ball damage, a rivet damage, a corrosion damage, an electric current damage, a pre-pitting damage, and a dirt level.

15. The method of claim 10, wherein the electric motor is an electric axle.

16. The method of claim 10, wherein determining the potential anomaly is further based on at least one selected from the group consisting of a coolant inlet temperature, a coolant outlet temperature, a vehicle speed, and an electric motor current.

17. The method of claim 10, wherein deriving the signal characteristic includes filtering out a background vibrational component from the sensor information.

18. The method of claim 10, wherein the electric vehicle is a hybrid vehicle or a fuel cell electric vehicle.

* * * * *